United States Patent [19]

Farnham et al.

[11] Patent Number: 5,639,837
[45] Date of Patent: Jun. 17, 1997

[54] PROCESS FOR MAKING FLUOROPOLYMERS

[75] Inventors: William Brown Farnham, Hockessin; Andrew Edward Feiring, Wilmington; Bruce Edmund Smart, Wilmington; Robert Clayton Wheland, Wilmington, all of Del.

[73] Assignee: E. I. Du Pont de Nemours and Company, Wilmington, Del.

[21] Appl. No.: 658,676

[22] Filed: Jun. 4, 1996

Related U.S. Application Data

[60] Provisional application No. 60/000,735, Jun. 30, 1995.
[51] Int. Cl.$^6$ .......................................... C08F 2/00
[52] U.S. Cl. .................... 526/222; 526/225; 526/247; 526/249; 526/254; 526/255
[58] Field of Search .................... 526/222, 225, 526/247, 249, 254, 255

[56] References Cited

U.S. PATENT DOCUMENTS

| | | | |
|---|---|---|---|
| 5,095,081 | 3/1992 | Bacque et al. | 526/222 |
| 5,285,002 | 2/1994 | Grootaert | 526/222 |
| 5,378,782 | 1/1995 | Grootaert | 526/222 |
| 5,486,544 | 1/1996 | Kawashima et al. | 526/222 |

FOREIGN PATENT DOCUMENTS

| | | | |
|---|---|---|---|
| 0106956 | 5/1984 | European Pat. Off. | 526/222 |
| 3925998 | 11/1964 | Japan | 526/222 |
| 0635074 | 4/1950 | United Kingdom | 526/222 |

*Primary Examiner*—Joseph L. Schofer
*Assistant Examiner*—N. Sarofim

[57] ABSTRACT

Disclosed herein is a process in which fluorine containing olefins are polymerized using an initiation system which is a combination of a fluoroaliphatic sulfinate or sulfinic acid and chlorate, bromate or hypochlorite ions. The resulting polymer contains fewer deleterious end groups and is more stable and/or easier to process. The polymers produced are useful as thermoplastics and elastomers.

22 Claims, No Drawings

PROCESS FOR MAKING FLUOROPOLYMERS

This application claims the priority benefit of U.S. Provisional Application 60/000,735, filed Jun. 30, 1995.

FIELD OF THE INVENTION

This invention concerns an improved process for the free radical polymerization of fluorine containing olefins by using a combination of a fluoraliphatic sulfinate or sulphinic acid and a water soluble bromate, chlorate or hypochlorite as a free radical generating system.

TECHNICAL BACKGROUND

Fluoropolymers, both partially and fully fluorinated, are important articles of commerce, being especially useful as thermoplastics and elastomers. Many of these polymers exhibit excellent chemical and/or thermal stability. One of the most important classes of these polymers are those that are made by the free radical (co)polymerization of one or more fluorine containing olefins, optionally with other copolymerizable vinyl monomers and/or ethylene.

During such polymerizations, end groups on the polymers are formed, some of which may have detrimetnal effects on the polymer properties. So-called ionic end groups have such an effect. Such groups, which are themselves ionic or may easily form ions when reacted with basic compounds, may be thermally unstable and/or cause the polymer to exhibit inferior processing characteristics. For instance such end groups may significantly raise the melt viscosity of such polymers, making them more difficult to mix and shape and/or cause instability in the polymer.

The end groups found on such polymers are often fragments of molecules that were part of the free radical initiator (system) or decomposition products thereof, and if present, any chain transfer agents. Therefore the nature of the initiator affects the nature of the polymer end groups.

U.S. Pat. No. 5,285,002 describes the polymerization of fluorine containing olefins using a fluoroaliphatic sulfinate and an oxidizing agent as a source of free radicals. No mention is made of the use of bromates, chlorates or hypochlorites as oxidizing agents.

SUMMARY OF THE INVENTION

This invention concerns a process for the preparation of a fluorine containing polymer, comprising, polymerizing, in an aqueous emulsion or suspension, a fluorine containing olefin, wherein the initiator is a combination of a fluoroaliphatic sulfinate or sulfinic acid and an oxidizing agent selected from the group consisting of chlorate ion, bromate ion, and hypochlorite ion, and provided that said fluoroaliphatic sulfinate or fluoraliphatic sulfinic acid and said oxidizing agent are water soluble.

DETAILS OF THE INVENTION

In the process described herein fluoropolymers are made from one or more fluorine containing olefins, and optionally other copolymerizable monomers. By a fluorine containing olefin is meant an olefin that contains one or more fluorine atoms. The fluorine atoms may be vinylic, as in vinyl or vinylidene fluoride, or attached to saturated carbon atoms as in 3,3,3-trifluoropropene, or both. The olefin may contain one or more fluorine atoms, and in one type of preferred fluorinated olefin, the olefin is perfluorinated. Useful fluoromonomers include tetrafluoroethylene (TFE), vinyl fluoride, vinylidene fluoride, hexafluoropropylene, chlorotrifluoroethylene, perfluoro(2,2-dimethyl-1,3-dioxole), and bromotrifluoroethylene. TFE is a preferred fluorine containing olefin.

Other monomers, which may not be fluorinated olefins, may also be present so long as they copolymerize with the fluorinated olefin(s) under free radical conditions. Such monomers are known in the art, see for instance W. Gethartz, et at., Ed., Ullmann's Encyclopedia of Industrial Chemistry, 3rd Ed., Vol. A11, p. 393–429, VCH Verlagsgesellschaft mbH, Weinheim, Germany (1988), and A. Logothetis, Prog. Polym. Sci., vol. 14, p. 251–296 (1989). Useful other monomers include ethylene, propylene, a perfluoro(alkyl vinyl ether) wherein the alkyl group contain 1 to 5 carbon atoms, especially perfluoro(methyl vinyl ether), perfluoro(ethyl vinyl ether), and perfluoro(n-propyl vinyl ether), alkyl trifluorovinyl ethers wherein the alkyl group contains 1 to 10 carbon atoms, $CF_2=CFOCF_2CF(CF_3)OCF_2CF_2CN$ (8CNVE), $CF_2=CFO[CF_2CF(CF_3)O]_yCF_2CF_2SO_2F$, wherein y is 0 or 1, and $CF_2=CFOCF_2CF(CF_3)O(CF_2)_zCO_2R^2$, wherein z is 2 or 3 and $R^2$ is aklyl containing 1 to 10 carbon atoms, preferably methyl. Preferred monomers and monomer combinations (to produce the corresponding homo- and copolymers) are: TFE; TFE/hexafluoropropylene; TFE/perfluoro(alkyl vinyl ether), especially perfluoro(methyl vinyl ether) or perfluoro(n-propyl vinyl ether); TFE/perfluoro-(2,2-dimethyldioxole); vinyl fluoride; tetrafluoroethylene/ethylene; chlorotrifluoroethylene/ethylene; tetrafluoroethylene/hexafluoropropylene/perfluoro(alkyl vinyl ether) wherein the alkyl group contains 1 to 5 carbon atoms; hexafluoropropylene/vinylidene fluoride; TFE/hexafluoropropylene/vinylidene fluoride; TFE/vinylidene fluoride; TFE/perfluoro(methyl vinyl ether)perfluorinated curesite monomer; chlorotrifluoroethylene. By a curesite monomer is meant a monomer which produces a repeat unit which allows ready crosslinking of the resulting polymer. For instance, under the proper crosslinking conditions, 8CNVE is a curesite monomer. Certain of these monomer combinations may produce either thermoplastic or elastomeric compositions, depending on the monomer proportions of the final polymer. Both types of polymers (thermoplastics and elastomers) are included within the meaning of such copolymers.

The free radical (co)polymerization of such fluorine containing olefins is generally well known, see for instance W. Gerhartz, et at., Ed., Ullmann's Encyclopedia of Industrial Chemistry, 3rd Ed., Vol. A11, p. 393–429, VCH Verlagsgesellschaft mbH, Weinheim, Germany (1988), and A. Logothetis, Prog. Polym. Sci., vol. 14, p. 251–296 (1989), both of which are hereby included by reference. Both of these references include information on aqueous suspension and emulsion polymerizations.

The initiation system herein is a combination of a fluoroaliphatic sulfinate or sulfinic acid and a specified oxidizing agent. By fluoroaliphatic herein is meant an alkyl, alkylene, alkenyl, or alkenylene group which contains at least one fluorine atom, and has one or two free valencies which are bound to sulfinic acid or sulfinate groups. The fluoroaliphatic group may be substituted with one or more functional groups which do not interfere with the polymerization, such as one or more ether groups. It is preferred that the fluoroaliphatic group have more fluorine atoms than hydrogen atoms, and it is more preferred that the fluorinated aliphatic group is perfluorinated. It is also preferred that the fluoroaliphatic group contain 1 to 20 carbon atoms. Suitable fluoroaliphatic groups include perfluoro-n- alkyl, especially perfluoro-n-alkyl containing 1 to 10 carbon atoms, perfluoroalkyl, ω-hydroperfluoro-n-alkyl, $CF_2=CFOCF(CF_3)CF_2OCF_2CF_2-$, perfluoro-n-alkenyl, $CF_3CH_2OCF_2CHFOCF_2CF(CF_3)OCF_2CF_2-$, and $H(CF_2)_xCH_2-$ wherein x is 2 to 10.

The fluoroaliphatic sulfinate or sulfinic acid may have the formula $[(R^1SO_2)_n]_qM_r$ wherein $R^1$ is fluoroaliphatic, M is a cation of charge s and s is 1 or 2, and n is an integer of 1 or 2 and corresponds to the number of free valencies on $R^1$, and r and q are 1 or 2. It is preferred that any, some or all of n, q, r and s are 1, so long as the equation q·n=r·s is satisfied (so this compound is electrically neutral). The equation q·n=r·s must be satisfied at all times. When M is a metal or ammonium ($NH_4^+$) the compound is a fluoroaliphatic sulfinate, while when M is hydrogen the compound is a fluoroaliphatic sulfinic acid. It is preferred that M is an alkali metal or $NH_4^+$, and it is more preferred that M is sodium. It is also preferred that a counterion for oxidant anion is an alkali metal cation, more preferably sodium.

The fluoroaliphatic sulfinate or sulfinic acid may be made by methods known in the art, see for instance Roesky, Angew. Chem. Int. Ed. Engl., vol. 10 p. 810–811 (1971); Harzdorf, et at., Justus Leibigs Ann. Chem., vol. 1973, p. 33–39; Roesky, et at., J. Fluorine Chem., vol. 7, p. 77–84 (1976); French Demande 2,660,923; and Benefice-Malouet, et al., J. Fluorine Chem., vol. 39, p. 125–140 (1988). Also preparation of these compounds is described in certain Experiments and Examples herein.

The oxidant herein is a bromate, chlorate or hypochlorite ion. Of course there must be a counterion to these an ions, and preferred counterions are alkali metal cations and ammonium ion. The oxidant may be added as the designated compound, or may be formed in situ during the polymerization process by the addition of compounds that form the proper oxidant ions but do not otherwise interfere with the polymerization process.

Both the sulfinate or sulfinic acid and the oxidant must be soluble in water. By soluble herein means that a solution which is at least about 0.0001M, preferably at least about 0.01M, in each component can be formed in water at the temperature at which the process is carried out.

The polymerization is carried out under aqueous emulsion or suspension conditions. Such conditions are known in the art (see above, and U.S. Pat. Nos. 4,524,197, 4,743,658, and 5,285,002, which are hereby included by reference; the latter also lists other monomers that can be used, as well as details as to how the polymer products of the process may be used, etc.). By under these conditions is meant that an aqueous phase is present in which at least some of the polymer which is made in the process is present as an emulsion or suspension. When the polymerization is an aqueous emulsion, a surfactant which stabilizes the dispersion of the polymer and/or monomer(s) in the aqueous medium is also present. Other solvents, which may or may not be miscible with the aqueous phase may also be present. Preferably these other solvents should not interfere with the polymerization, for instance by causing excessive chain transfer. A useful solvent is 1,1,2-trichlorotrifluoroethane.

Before and during the polymerization it is preferred that the ingredients be essentially oxygen free. It is noted that oxygen may tend to oxidize sulfinates or sulfinic acids, thereby lowering polymer yields.

It is believed that the polymerization herein takes place by a free radical polymerization mechanism, and that the initiator system is theorized to produce these free radicals. The conditions for the polymerization process described herein are conventional, i.e., are those normally used for other free radical polymerizations of fluorinated olefins. While not critical, temperatures may range from about 20° C. to about 150° C., preferably about 70° C. to about 110° C. The approximate minimum particular temperature which may be used within this range to obtain a convenient polymerization rate depends upon the particular initiation system chosen, the process conditions and the monomers used, and is easily determined by minimal experimentation. Pressures (when using a gaseous monomer) may range from about 0.1 MPa to about 70 MPa, preferably 0.07 MPA to about 20 MPa, more preferably 0.7 MPa to about 7 MPa. Usually the amount of either sulfinate or sulfinic acid and oxidizing agent will each be about 0.001 to about 1 mole percent of the total monomers that are polymerized, depending on the desired molecular weight of the polymer, process conditions, etc. An excess of the sulfinate or sulfinic acid may be employed over the amount of oxidant present, but stoichiometric quantities (in relationship to each other and the particular redox reaction involved) may also be used. The process may be carried out in any conventional manner, such as batch, semi-batch (sometimes also called semi-continuous), or continuous. Other ingredients which may normally also be present in such polymerizations, such as chain transfer agents, may also be present.

When operating in a batch or semi-batch mode, i.e., all of the monomer added at the beginning or during the polymerization, but not withdrawn during the polymerization, improved molecular weight distributions may be obtained by continuously co-feeding separate solutions of the sulfinate and oxidant to the reactor throughout the polymerization.

It has also been found that when ammonia is present in the polymerization process the number of ionic end groups is decreased even further. It is preferred that at least about 0.1 mole, more preferably at least about one mole of ammonia be present for each mole of sulfinate or sulfinic acid present in the process.

The polymer produced by the instant process have very low unstable and/or ionic end group contents, such as sulfonic acid and/or carboxyl groups. These levels are lower than when a sulfinate and other oxidizing agents is the initiator system. The polymers are useful as molding resins, as wire and cable insulation, chemically resistant coatings, non-stick surfaces, gaskets, O-rings, seals, chemically resistant laboratory ware, etc. In these uses, as appropriate, the polymers may be thermoplastic or elastomeric. If the polymer is poly(tetrafluoroethylene), it may be processed as poly(tetrafluoroethylene) made by other processes.

Polymer Analysis

Melt index tests were run using a Slocomb Model F extrusion plastometer with a 316 stainless steel die 0.947 cm in diameter and with an orifice 0.318 cm long and 0.0794 cm in diameter. The plastometer was heated to 372° C. After loading 2 g samples of polymer, reinserting the piston, and waiting for 5 minutes for thermal equilibration, the piston was loaded with a dead weight so that the piston and dead weight together totaled 5 or 15 kg. The time required for all or part of the sample to be extruded was measured, stopping after 5 min for polymers showing no extrusion at all. The weight of the polymer extruded divided by the number of minutes over which the extrusion occurred is reported here as the melt index.

The number of unstable end groups was determined by infrared spectroscopy on thin polymer films which were compacted by pressing at room temperature. Peak intensities at about 1775, 1815, 1795 and 1660 cm$^{-1}$ were used to determine COOH (dimer), COOH (monomer), CF=CF$_2$ and CO$_2$Na concentrations, respectively. Intensity of a band at about 2365 cm$^{-1}$ was used to correct absorptions for film thickness. The total of —CO$_2$H, —CF=CF$_2$ and —CO$_2$Na groups is reported as number of unstable ends per 10$^6$ polymeric carbon atoms. In a similar fashion, the weight percentage of hexafluoropropylene incorporated into its copolymers with tetrafluoroethylene was determined by the intensity of an infrared band at about 980 cm$^{-1}$.

EXPERIMENT 1

Preparation of C$_8$F$_{17}$SO$_2$Li

A round bottomed flask was loaded with 100 g of perfluorooctanesulfonyl fluoride, 50 ml of 1,2-dimethoxyethane, 200 ml of water, and 67 g of lithium sulfite monohydrate. The mixture was heated for 6 hours at 80° C., cooled, and then much of the solvent removed by purging with a nitrogen stream at 70° to 80° C. The residue was extracted three times with 200 ml of refluxing 1-butanol. The combined extracts were slurried with 5 g of Darco® activated carbon and 50 g of chromatographic silica gel and filtered, washing five times with 50 ml of 1-butanol. The filtrate was stripped first on a rotary evaporator and then with a vacuum pump while warming on a steam bath. Drying was continued in a desiccator and finished in a vacuum oven at 86° C., giving 77 g of product.

Elemental Analysis Found: 19.85% C, 60–67% F, 7.28% S, 1.76% Li Calc. C$_8$F$_{17}$SO$_2$Li: 19.61% C, 65.90% F, 6.54% S, 1.42% Li The major contaminants appear to be Li$_2$SO$_4$, and Li$_2$SO$_3$, wet chemical analysis finding 8.9% sulfate ions and 1.9% sulfite ions.

EXAMPLE 1

Initiation of Vinylidene Fluoride/ Hexafluoropropylene Polymerization with C$_8$F$_{17}$SO$_2$Li/NaBrO$_3$ A 400 ml autoclave was loaded with 200 ml water, 1.09 g of C$_8$F$_{17}$SO$_2$Li, and purged with nitrogen. The autoclave was cooled, evacuated, and loaded with 60 g of hexafluoropropylene and 40 g of vinylidene fluoride. A solution of 0.5 g of sodium bromate in 50 ml of water was injected at 0.3 ml/minute. Pressure within the autoclave decreased from 2.15 MPa at 22° C. to 1.65 MPa at 24° C., 3 hours later. The autoclave was vented, the polymeric emulsion recovered and then broken by freezing. Filtering and drying gave 38 g of hexafluoropropylene/vinylidene fluoride copolymer with an inherent viscosity of 0.37.

EXAMPLE 2

Initiation of Tetrafluoroethylene/ Hexafluoropropylene Polymerization with C$_8$F$_{17}$SO$_2$Li/NaBrO$_3$ A 400 ml autoclave was loaded with 100 ml water and 1.0 g of C$_8$F$_{17}$SO$_2$Li. The autoclave was cooled, evacuated, and loaded with 75 g of hexafluoropropylene and 50 g of tetrafluoroethylene. A solution of 0.5 g of sodium bromate in 50 ml of water was injected over about 3 to 4 hours at 20° to 25° C. The autoclave was vented, the polymeric emulsion recovered, and the emulsion broken by freezing. Filtering, washing 10 times with 200 ml of 1:1 methanol/water, and drying under vacuum gave 31 g of hexafluoropropylene/tetrafluoroethylene copolymer too high in molecular weight to extrude in a melt index apparatus at 372° C. with a 15 kg weight.

EXAMPLE 3

Initiation of Tetrafluoroethylene Polymerization with C$_8$F$_{17}$SO$_2$Li/NaBrO$_3$ A 500 ml resin kettle was loaded with 200 ml of water and 0.97 g of C$_8$F$_{17}$SO$_2$Li. The kettle was purged with argon three times and then pressured to 0.43 MPa from a 1 liter cylinder containing 33 g of tetrafluoroethylene. A solution of 1 g NaBrO$_3$ in 15 ml of water was prepared and 5.6 ml injected in 0.1 ml increments over the next 20 minutes at 26° to 28° C. After another 162 minutes, pressure in the kettle was vented from 0.055 MPa to atmospheric. The emulsion was recovered and broken by freezing. The resulting precipitate was filtered and washed 10 times with 200 ml of 1:1 methanol/water. Drying under vacuum gave 20 g of polymer, the molecular weight of which was too high to extrude in a melt index apparatus at 372° C. with a 15 kg weight.

EXAMPLE 4

Preparation of C$_8$F$_{17}$SO$_2$H and Initiation of Tetrafluoroethylene Polymerization A. Preparation of ion exchange resin A chromatography column with a Teflon® fluoropolymer stopcock was loaded with 200 ml of Dowex® 50WX8, a sulfonic acid ion exchange resin. The column was washed three times with 100 ml of 85° C. water until the eluate came through colorless. The resin was then washed in succession with 600 ml 3N NaOH, 600 ml 85° C. water, 600 ml MeOH (methanol), 600 ml water, 600 ml 3N HCl, 600 ml 85° C. water, 600 ml MeOH, 600 ml water. This cycle was repeated another three times. After the third cycle the column was washed very slowly with 1000 ml of 3N HCl. Titration of the damp resin with 0.1N NaOH found 2 meq of acid per ml of resin.

B. Preparation of C$_8$F$_{17}$SO$_2$Na

A round bottomed flask was loaded with 100 g of perfluorooctanesulfonyl fluoride, 50 ml of 1,2-dimethoxyethane, 200 ml of water, and 76 g of sodium sulfite. The mixture was heated for 6 hours at 81° C., cooled, and then much of the solvent removed by purging with a nitrogen stream at 70° to 80° C. The residue was extracted three times with 200 ml of refluxing 1-butanol. The combined extracts were slurried with 5 g of Darco® activated carbon and 50 g of chromatographic silica gel and faltered, washing five times with 50 ml of 1-butanol. The filtrate was stripped first on a rotary evaporator, then with a vacuum pump, giving ~85 g. A sample sent for elemental analysis was dried additionally for several days at 80° C. in a vacuum oven.

Elemental Analysis Found: 18.15% C, 54.95% F, 7.55% S, 7.07 % Na Calc. C$_8$F$_{17}$SO$_2$Na: 18.97% C, 63.83% F, 6.34% S, 4.54% Na The major contaminants appear to be Na$_2$SO$_4$, and Na$_2$SO$_3$, wet chemical analysis finding 12.37% sulfate ions and 0.75% sulfite ions.

C. Initiation of tetrafluoroethylene polymerization with C$_8$F$_{17}$SO$_2$H/NaBrO$_3$ A chromatography column was loaded with 20 ml of the Dowex® resin prepared above. The resin was rinsed with 100 ml of water, the rinse water being drained entirely from column and discarded. A solution of 1 g $C_8F_{17}SO_2Na$ dissolved in 30 ml of water and then 170 ml of distilled water were passed through column, draining directly into a 500 ml polymerization kettle. Passage through the ion exchange resin presumably converts $C_8F_{17}SO_2Na$ to $C_8F_{17}SO_2H$. The kettle was sealed, purged with argon and evacuated to 100 mm three times and finally pressured to 0.50 MPa from a 1 liter cylinder containing 33 g of TFE. A solution made by dissolving 1 g of sodium bromate in 10 ml of water was injected into the polymerization kettle in 0.1 ml increments over about 89 minutes. After another 24 minutes the kettle was vented from 0.22 MPa to atmospheric. The product was a polymeric emulsion with a pH of 1.8. Breaking the emulsion by freezing, filtering, washing 10 times with 200 ml of 1:1 methanol/water, and drying under vacuum gave 18 g of poly(tetrafluoroethylene) that extruded at 0.4 g/min in a melt index apparatus at 372° C. with a 15 kg weight.

D. Initiation of tetrafluoroethylene polymerization with $C_8F_{17}SO_2H/HBrO_3$ A chromatography column was loaded with 30 ml of the Dowex® resin prepared in Part A above. The resin was rinsed with 100 ml of water, the rinse water being discarded. Enough water (14 ml) was added to the chromatography column to completely immerse the resin. A solution of 1 g of $NaBrO_3$ in 15 ml of water was poured in carefully on top. The contents of the column were then slowly drained through the resin, discarding the first 14 ml and saving the eluate, a solution presumably containing $HBrO_3$.

A fresh sample of Dowex® ion exchange resin was used to introduce $C_8F_{17}SO_2H$ in the resin kettle as in part B above. The kettle was sealed, purged with argon and evacuated to 100 mm three times, and finally pressured to 0.52 MPa from a 1 liter cylinder containing 33 g of TFE. The $HBrO_3$ solution taken off the ion exchange resin above was injected into the polymerization kettle in 0.1 ml increments over about 68 minutes. After another 64 minutes the kettle was vented from 0.055 MPa at 26° C. to atmospheric. Only precipitated polymer was evident in the recovered reaction mixture, the pH of which was found to be 1.8. Filtering, washing 10 times with 200 ml of 1:1 methanol/water, and drying under vacuum gave 30 g of poly(tetrafluoroethylene) too high in molecular weight to extrude in the melt index apparatus at 372° C. with a 15 kg weight.

EXPERIMENT 2

Preparation of $CF_2=CFOCF(CF_3)CF_2OCF_2CF_2SO_2Na$

The contents of a flask loaded with 50 ml of 1,2-dimethoxyethane, 200 ml of water, 76 g of sodium sulfite, and 59 ml of $CF_2=CFOCF(CF_3)CF_2OCF_2CF_2SO_2F$ were refluxed and stirred overnight at 80° C. under $N_2$. The reaction mixture was concentrated under a stream of $N_2$ at 50° C. Extraction five times with 100 ml of refluxing isopropyl alcohol, concentration to solids first on a rotary evaporator and then with a vacuum pump gave 16 g of solids presumed to be $CF_2=CFOCF(CF_3)CF_2OCF_2CF_2SO_2Na$.

EXAMPLE 5

Initiation of Tetrafluoroethylene Polymerization with $CF_2=CFOCF(CF_3)CF_2OCF_2CF_2SO_2Na/KBrO_3$ A 500 ml resin kettle was loaded with 200 ml of water and 1 g of $CF_2=CFOCF(CF_3)CF_2OCF_2CF_2SO_2Na$. The kettle was purged with argon and evacuated to 100 mm three times and then pressured to 0.50 MPa from a 1 liter cylinder containing 33 g of tetrafluoroethylene. A solution of 1 g $NaBrO_3$ in 15 ml of water was prepared and 7.5 ml injected in 0.1 ml increments over the next 141 minutes at 22 to 31° C. After another 10 minutes, pressure in the kettle was vented from 0.24 MPa to atmospheric. Precipitated polymer was recovered, filtered, washed 10 times with 200 ml of 1:1 methanol/water. Drying under vacuum gave 15 g of polymer, the molecular weight of which was too high to extrude in a melt index apparatus at 372° C. with a 15 kg weight.

EXPERIMENT 3

Preparation of $C_6F_{13}SO_2Na$

1-Iodoperfluorohexane (89.2 g, 0.2 mol) was added rapidly to a stirred mixture of 16.8 g (0.2 mol) of sodium bicarbonate, 418 g (0.24 mol) sodium dithionate, 60 mL of water and 60 mL of acetonitrile at room temperature. After 1.5 hr, the mixture was heated to 55° C. and maintained for 4 hr. The mixture was then concentrated on a rotary evaporator to remove the acetonitrile. Ethyl acetate (250 mL) was added and the mixture was faltered. The solid was dissolved in an additional 200 mL of ethyl acetate. The combined ethyl acetate solutions were washed with saturated aqueous sodium chloride solution, dried over anhydrous sodium sulfate and concentrated on a rotary evaporator. The solid residue was recrystallized three times from 350 mL of isopropanol to give in two crops 55 g of white solid. $^{19}F$ NMR ($CDCl_3$) −80.6 (3F), −121.6 (2F), −122.2 (2F), −122.4 (2F), −125.7 (2F), −130.7 (2F).

EXPERIMENT 4

Preparation of $C_8F_{17}SO_2Na$

The procedure of Experiment 2 was followed using 109.2 g (0.2 mol) of 1-iodoperfluoro-octane. Two recrystallizations of the crude product from 1.4 L of isopropanol gave 79.8 g of the title compound. $^{19}F$ NMR ($CDCl_3$) −80.6 (3F), −121.4 (6F), −122.1 (4F), −125.7 (2F), −130.9 (2F).

EXPERIMENT 5

Preparation of $C_8F_{17}SO_2NH_4$

A 2-L separatory funnel was charged with 810 mL of water and 30 mL of concentrated sulfuric acid. After cooling to room temperature and bubbling with argon to remove oxygen, 31 g of $C_8F_{17}SO_2Na$ was added. This mixture was extracted twice with 250 mL of deoxygenated ether. The combined ether extracts were concentrated on a rotary evaporator and then dried at 0.025 mm and 35° C. to a white solid. The solid was dissolved in 200 mL of dry ether and treated at −5° C. with a slight excess of anhydrous ammonia gas. The suspension was evaporated to dryness on a rotary evaporator and then dried for 24 hr at 0.025 mm and 35° C. giving 29.8 g of white ammonium salt. $^{19}F$ NMR ($CD_3OD$) −80.8 (3F), −121.4 (6F), −121.9 (2F), −122.1 (2F), −125.7 (2F), −130.2 (2F). $^1H$ NMR showed at peak at 4.92 ppm.

EXPERIMENT 6

Preparation of $C_4F_9SO_2NH_4$

A mixture of 400 mL of water, 110.9 g sodium bicarbonate and 200 mL of acetonitrile was warmed to 30° C. 1-Iodoperfluorobutane (415.1 g, 1.2 mol) was added followed by 250.7 g (1.44 mol) of sodium dithionite. Vigorous gas evolution was observed after a short induction period. After gas evolution ceased, the mixture was heated to 55° C. for 6 hr. Deoxygenated ethyl acetate (1-L) was added and the organic layer was separated. It was washed with saturated aqueous sodium chloride solution and evaporated to dryness on a rotary evaporator, heating to 70° C. at 0.5 min. The solid-residue was recrystallized from 1-L deoxygenated isopropanol giving 112.5 g of white solid. An additional 145.7 g of product was collected from concentrations of the filtrate for a total yield of 258.2 g (70%) of sodium perfluorobutanesulfinate.

The sodium perfluorobutanesulfinate (330 g) from several preparations was added to a cold, deoxygenated solution of 100 mL of concentrated sulfuric acid and 500 mL of water. This solution was extracted with 600 mL and 2×300 mL portions of ether. The combined ether extracts were washed with 3×100 mL of saturated aqueous sodium chloride solution and evaporated on a rotary evaporator to a liquid. This liquid was dissolved in 500 mL of ether and treated with excess ammonia gas. The ether was evaporated on a rotary evaporator and the residue was dried at 75° C. and 0.1 mm to give 321.9 g of the title compound. $^{19}$F NMR (CD$_3$OD) –80.9 (3F), –122.9 (2F), –125.9 (2F), –130.4 (2F). $^1$H NMR showed at peak at 4.92 ppm.

EXAMPLES 6–11 AND COMPARATIVE EXAMPLES A–C

Polymerization of Tetrafluoroethylene/ Hexafluoropropylene with Sulfinate Salts and Oxidizing Agents A 1-L stainless steel autoclave equipped with mechanical stirring was flushed with nitrogen and charged with 600 mL of distilled, deoxygenated water, ammonia (if used) in the form of concentrated aqueous solution, and the sulfinate salt. The reactor was cooled, charged with 120 g of hexafluoropropylene and 50 g of tetrafluoroethylene and heated with stirring to the desired reaction temperature. A solution of the oxidant in 25 mL of water was fed to the reactor over 5 minutes. After reaction for 2 hours, the reactor was cooled to room temperature and vented to atmospheric pressure. The aqueous dispersion was recovered, frozen in dry ice, thawed and filtered. The solid polymer was stirred with about 1-L of distilled water at 80° C., filtered and dried in a vacuum oven at about 120° C. overnight under a flow of nitrogen. The weight of polymer was determined and the weight percent of hexafluoropropylene was determined by infrared spectroscopy on a cold-pressed film. The total number of unstable end groups (carboxylic acid, carboxylate and vinyl) was also determined by infrared analysis and is reported as number of ends per $10^6$ carbon atoms.

| Example | Sulfinate (g) | Oxidant (g) | NH$_3$ (mL) | Temp (°C.) | Polymer Yield | Wt. % HFP | Unstable End Groups |
|---|---|---|---|---|---|---|---|
| 7 | C$_8$F$_{17}$SO$_2$NH$_4$ (1.51) | NaBrO$_3$ (0.30) | — | 100 | 31.5 | 14.9 | 110 |
| 8 | C$_8$F$_{17}$SO$_2$NH$_4$ (1.51) | NaBrO$_3$ (0.30) | 1 | 100 | 49.7 | 13.0 | <5 |
| 9 | C$_8$F$_{17}$SO$_2$NH$_4$ (1.51) | NaClO$_3$ (0.22) | — | 100 | 22.4 | 16.7 | 332 |
| 10 | C$_8$F$_{17}$SO$_2$NH$_4$ (1.51) | NaClO$_3$ (0.22) | 1 | 100 | 24.6 | 16.3 | 45 |
| 11 | C$_8$F$_{17}$SO$_2$NH$_4$ (1.51) | NaClO$_3$ (0.22) | 1 | 85 | 33.8 | 14.9 | 120 |
| 12 | C$_8$F$_{17}$SO$_2$NH$_4$ (1.51) | NaOCl (0.15) | 1 | 100 | 28.4 | 16.4 | trace |
| A | C$_8$F$_{17}$SO$_2$NH$_4$ (1.51) | (NH$_4$)$_2$S$_2$O$_8$ (0.46) | 1 | 100 | 31.7 | 16.6 | 1010 |
| B | C$_8$F$_{17}$SO$_2$NH$_4$ (1.51) | H$_2$O$_2$ (0.075) | 1 | 100 | 22.5 | 13.8 | 1071 |
| C | C$_8$F$_{17}$SO$_2$NH$_4$ (1.51) | NaBO$_3$.4H$_2$O (0.31) | — | 100 | 26.2 | >10.0 | 1417 |

EXAMPLE 12

Polymerization of Tetrafluoroethylene/ Hexafluoropropylene with Ammonium Perfluorooctanesulfinate and Sodium Chlorate A 4-L horizontal autoclave with mechanical agitator was paged with nitrogen and charged with 2-L of distilled water containing 1 mL of concentrated aqueous ammonia and 10 g of ammonium perfluorooctanesulfinate. The reactor was closed, the contents were heated to 103° C. and agitated at 90 rpm. The reactor was flushed with a mixture of 70 weight % hexafluoropropylene and 30 weight % tetrafluoroethylene and then pressured to 4.5 MPa with this gas mixture. A solution of 1.2 g of sodium chlorate in 1-L of water was injected at the rate of 6 mL/minute for 12 minutes. Then a solution of 2.8 g of sodium chlorate in 1-L of water was injected at the rate of 1 mL/minute and pressure in the reactor was maintained at 4.5 MPa by addition of tetrafluoroethylene. A total of 804 g of tetrafluoroethylene was added over 137 minutes. The initiator and tetrafluoroethylene flow was halted, the reactor was allowed to cool and vented to atmospheric pressure. The reactor contents were discharged, frozen in dry ice, thawed and filtered. The solid polymer was stirred with about 2-L of distilled water at 80° C., filtered and dried in a vacuum oven at about 120° C. overnight under a flow of nitrogen. Amount of polymer isolated was 943.5 g of fluffy white powder. By infrared analysis, the polymer contained 13.6 wt % hexafluoropropylene and had no detectable unstable end groups. The polymer had a melting point of 261.5° C. (18.1 J/G) by DSC and extruded at 2.35 g/min in a melt index apparatus at 372° C. with a 5 kg weight.

EXAMPLE 13

Polymerization of Tetrafluoroethylene/ Hexafluoropropylene with Ammonium Perfluorooctanesulfinate and Sodium Hypochlorite A 4-L horizontal autoclave with mechanical agitator was purged with nitrogen and charged with 2-L of distilled water containing 2 mL of concentrated aqueous ammonia, 2.24 g of ammonium perfluorooctanoate surfactant and 4.5 g of ammonium perfluorooctanesulfinate. The reactor was closed, the contents were heated to 103° C. and agitated at 90 rpm. The reactor was flushed with a mixture of 70 weight % hexafluoropropylene and 30 weight % tetrafluoroethylene and then pressured to 4.5 MPa with this gas mixture. A solution prepared by diluting 4.8 g of 5.6% aqueous sodium hypochlorite to 250 mL with distilled water was injected at the rate of 6 mL/minute for 12 minutes. Then a solution prepared by diluting 12.9 g of 5.6% aqueous sodium hypochlorite to 500 mL of distilled water was injected at the rate of 1 mL/minute and pressure in the reactor was maintained at 4.5 MPa by addition of tetrafluoroethylene. A total of 840 g of tetrafluoroethylene was added over 149 minutes. The initiator and tetrafluoroethylene flow was halted, the reactor was allowed to cool and vented to atmospheric pressure. The reactor contents were discharged. After removing a 50 mL aliquot of the aqueous dispersion for further analysis, the remaining latex was frozen in dry ice, thawed and filtered. The solid polymer was stirred with about 2-L of distilled water at 80° C., filtered and dried in a vacuum oven at about 120° C. overnight under a flow of nitrogen. Amount of polymer isolated was 936.1 g of fluffy white powder. By infrared analysis, the polymer had no detectable unstable end groups. By high temperature fluorine NMR analysis of the polymer melt, it was determined to contain 10.4 wt % hexafluoropropylene. The polymer had a melting point of 264.5° C. (25.3 J/G) by DSC and extruded at 0.134 g/min in a melt index apparatus at 372° C. with a 15 kg weight.

COMPARATIVE EXAMPLE D

Polymerization of Tetrafluoroethylene/ Hexafluoropropylene with Ammonium Perfluorooctanesulfinate and Ammonium Persulfate A 4-L horizontal autoclave with mechanical agitator was purged with nitrogen and charged with 2-L of distilled water containing 1 mL of concentrated aqueous ammonia and 5 G of ammonium perfluorooctanesulfinate. The reactor was closed, the contents were heated to 103° C. and agitated at 90 rpm. The reactor was flushed with a mixture of 70 weight % hexafluoropropylene and 30 weight % tetrafluoroethylene and then pressured to 4.5 MPa with this gas mixture. A solution of 4 g of ,ammonium persulfate in 1 -L of water was injected at the rate of 6 mL/minute for 12 minutes. Then a solution of 7 g of potassium persulfate in 1-L of water was injected at the rate of 1 mL/minute and pressure in the reactor was maintained at 4.5 MPa by addition of tetrafluoroethylene. A total of 764 g of tetrafluoroethylene was added over 194 minutes. The initiator and tetrafluoroethylene flow was halted, the reactor was allowed to cool and vented to atmospheric pressure. The reactor contents were discharged, frozen in dry ice, thawed and filtered. The solid polymer was stirred with about 2-L of distilled water at 80° C., filtered and dried in a vacuum oven at about 120° C. overnight under a flow of nitrogen. Amount of polymer isolated was 965.3 g of fluffy white powder. By infrared analysis, the polymer contained 14.0 wt % hexafluoropropylene and had 160 carboxylic acid end groups per $10^6$ carbon atoms. The polymer had a melting point of 241.2° C. (22.1 J/G) by DSC and extruded at 1.80 g/min in a melt index apparatus at 372° C. with a 5 kg weight.

EXPERIMENT 7

Preparation of $CF_3CH_2OCF_2CHFOCF_2CF(CF_3)$ $OCF_2CF_2SO_2Na$

Preparation of $CF_3CH_2OCF_2CHFOCF_2CF(CF_3)OCF_2CF_2I$

A 10 mL Hastalloy® pressure vessel was charged with acid chloride $CF_3CH_2OCF_2CHFOCF_2CF(CF_3)OCF_2CF_2C$ (O)Cl (3.16 g, 6 mmol) and powdered KI (1.30 g), sealed and heated to 200° C. for 9 hr. Removal of product from the vessel afforded 1.5 g of liquid which was homogeneous by GC analysis. IR lacked carbonyl absorptions, and $^{19}$F NMR (THF-d8) showed −69.33 and −69.40 (triplets of equal area, J=5.5, −$CF_2I$), −74.77 (overlapping m, $CF_3CH_2$), −79.85 (apparent quartet, J=8.1, $CF_3$), −82.7 to −85.6 (overlapping AB patterns, $CF_2$), −90.01 and −90.53 (AB pattern, $CF_2CFH$), −145.09 (q, J=22.9, CF), −145.85 (d of m's, J=51 Hz, CHF), in accord with a mixture of diastereomeric iodides.

Preparation of $CF_3CH_2OCF_2CHFOCF_2CF(CF_3)$ $OCF_2CF_2SO_2Na$

A 50 mL 3-neck flask fitted with a nitrogen inlet, septum adapter, and thermocouple was charged with sodium bicarbonate (0.27 g, 3.2 mmol), water (5 mL), and acetonitrile (2 mL) and cooled to 5° C. Sodium dithionite (0.67 g, 3.84 mmol) was added and the iodide $CF_3CH_2OCF_2CHFOCF_2CF(CF_3)OCF_2CF_2I$ (1.89 g, 3.2 mmol) was added dropwise. The mixture was warmed to room temperature and stirred for 18 h. Volatiles were removed under vacuum to afford 1.99 g of white solid which was treated with 10 ml of hot isopropyl alcohol, faltered, and evaporated to give 1.15 g of waxy solid. $^1$H NMR ($CD_3OD$): 6.62 (d of triplets, J=52, 3 Hz), 4.52 (doubled quartets, J=8.3 Hz). $^{19}$F NMR ($CD_3OD$): −74.6 (s, $CF_3$), −79.6 (s, $CF_3$) and AB pattern −79.45 and −80.01 (J=142 Hz), two closely spaced AB patterns at −82.93 and −84.42 (J=144 Hz), and −83.11 and −84.64 (J=144 Hz), pair of AB patterns at −89.42 and −90.44 (J=144 Hz), and −89.41 and −90.57 (J=143 Hz), −144.5 (m) and −145.5 (m), —$CF_2SO_2$ signals at −133.22 to −133.35, in accord with the assigned structure.

EXAMPLE 14

Polymerization of Tetrafluoroethylene/ Hexafluoropropylene with $CF_3CH_2OCF_2CHFOCF_2CF(CF_3)OCF_2CF_2SO_2Na$/ $NaBrO_3$ A 1-L stainless steel autoclave equipped with mechanical stirring was flushed with nitrogen and charged with a solution prepared with 600 mL of distilled, deoxygenated water, ammonium hydroxide (I mL) and $CF_3CH_2OCF_2CHFOCF_2CF(CF_3)OCF_2CF_2SO_2Na$ (1.0 g), and $C_7F_{15}CO_2NH_4$ (1.0 g). The reactor was cooled, charged with 120 g of hexafluoropropylene and 50 g of tetrafluoroethylene and heated with stirring to 100° C. A solution of sodium bromate (0.25 g in 25 mL of water) was fed to the reactor over 5 minutes. After reaction for 3 hours, the reactor was cooled to room temperature and vented to atmospheric pressure. The aqueous dispersion was recovered, frozen in dry ice, thawed and filtered. The solid polymer was stirred with about 1-L of distilled water at 80° C., filtered and dried in a vacuum oven at about 120° C. overnight under a flow of nitrogen to give 24.3 g of product. The total number of carboxylic acid, carboxylate and vinyl end groups (per $10^6$ carbon atoms), determined by infrared analysis on a cold-pressed film, was found to be below the detection limit. $^{19}$F NMR (melt, at 300° C.) showed, as major polymer signals, −71 (bd s, a=8.02), −110 and −116 to −122 (re's, a=133.3), −179 (trace s, corresponding to HFP diads, a=0.06), −182.5 (s, a=2.80); also present were signals due to fragments derived from the sulfinate initiator (−76.8 (bd s, a=0.45), −79.5 and −80.3, −83 to −86 (bd), −90 (bd s, a=0.28), −140.5 (bd s, a=0.15), and −145.5 (bd s, a=0.17). Integration indicated that wt % hexafluoropropylene=11.1%. Solid state $^{19}$F NMR (at 15 kHz) also revealed signals corresponding to initiator-derived polymer ends, and all signals in the spectrum exhibited nearly the same $T_1$ values, ca. 600 ms.

EXPERIMENT 8

Preparation of $H(CF_2)_6CH_2SO_2Na$

A 250 mL 3-neck flask, fitted with a nitrogen inlet and reflux condenser, septum adapter, and thermocouple, was charged with sodium bicarbonate (3.28 g, 39 mmol), water (40 mL), and acetonitrile (40 mL). Sodium dithionite (8.91 g, 51 mmol) was added and the iodide $H(CF_2)_6CH_2I$ (16.62 g, 38 mmol) was added dropwise. The mixture was heated to 50° C. for 18 h. Volatiles were removed under reduced pressure, and the resulting solid was partially dissolved in methanol, faltered, and stripped to give 16.3 g of solid. The solid was transferred to a dry box, dissolved in tetrahydrofuran, filtered, and evaporated. The recovered solid was re-precipitated by dissolving it in a minimal volume of tetrahydrofuran and adding this solution to petroleum ether to provide 14.0 g of white solid. $^1$H NMR ($CD_3OD$): 6.60 (tt, J=51, 6 Hz, 1H), 2.90 (t, J=20 Hz, 2H). $^{19}$F NMR ($CD_3OD$): −110.0 (m), −121.2 (bd s), −122.9 (s), −129.3 (s), −138.0 (d, J=52); ($D_2O$): −110.8 (m), −122.2 (s), −123.6 (s), −124.0 (s), −130.4 (s), −138.5 (d, J=52) consistent with the assigned structure. Anal. Calcd for $C_7H_3F_{12}SO_2Na$ C, 20.91; H, 0.75; F, 56.69; S, 7.97. Found: C, 15.61, 15.56; H, 1.00, 1.07, indicative of inorganic byproducts present in the sample.

EXAMPLE 16

Polymerization of Tetrafluoroethylene/
Hexafluoropropylene with Ammonium
Perfluorobutanesulfinate and Sodium Hypochlorite A 4-L horizontal autoclave with mechanical agitator was purged with nitrogen and charged with 2-L of distilled water containing 4.48 g of ammonium perfluorooctanoate surfactant. The reactor was closed, the contents were heated to 103° C. and agitated at 90 rpm. The reactor was flushed with a mixture of 70 weight % hexafluoropropylene and 30 weight % tetrafluoroethylene and then pressured to 4.5 MPa with this gas mixture. Two solutions, one prepared by diluting 20.0 g of 5.6% aqueous sodium hypochlorite to 250 mL with distilled water, and the other prepared by adding distilled, deoxygenated water to 11.25 g of $CF_3CF_2CF_2CF_2SO_2NH_4$ to a final volume of 250 mL (including 1.0 mL of concentrated ammonium hydroxide), were injected at the rate of 6 mL/minute for 3 minutes. Then the above solutions were injected at the rate of 0.75 mL/minute for the remaining reaction time while pressure in the reactor was maintained at 4.5 MPa by addition of tetrafluoroethylene. A total of 732 g of tetrafluoroethylene was added over 183 minutes. The initiator and tetrafluoroethylene flows were halted, the reactor was allowed to cool and vented to atmospheric pressure. The reactor contents were discharged. After removing a 50 mL aliquot of the aqueous dispersion for further analysis, the remaining latex was frozen in dry ice, thawed and faltered. The solid polymer was stirred with about 2-L of distilled water at 80° C., filtered and dried in a vacuum oven at about 120° C. overnight under a flow of nitrogen. Amount of polymer isolated was 835.2 g of fluffy white powder. By infrared analysis, the polymer contained 47 carboxyl end groups/$10^6$ carbon atoms. High temperature $^{19}$F NMR analysis of the polymer melt revealed 10.2 wt % hexafluoropropylene incorporation. The polymer had a melting point of 275° C. (26.3 J/g) by DSC and was of too low molecular weight for assessment by standard melt index measurement.

EXAMPLE 17

Polymerization of Tetrafluoroethylene/
Hexafluoropropylene with Ammonium
Perfluorobutanesulfinate and Sodium Hypochlorite A 4-L horizontal autoclave with mechanical agitator was purged with nitrogen and charged with 1H-perfluorohexane (10 g) and 2-L of distilled water containing 4.48 g of ammonium perfluorooctanoate surfactant. The reactor was closed, the contents were heated to 103° C. and agitated at 90 rpm. The reactor was flushed with a mixture of 70 weight % hexafluoropropylene and 30 weight % tetrafluoroethylene and then pressured to 4.5 MPa with this gas mixture. Two solutions, one prepared by diluting 20.0 g of 5.6% aqueous sodium hypochlorite to 250 mL with distilled water, and the other prepared by adding distilled, deoxygenated water to 11.25 g of $CF_3CF_2CF_2CF_2SO_2NH_4$ to a final volume of 250 mL (including 1.0 mL of concentrated ammonium hydroxide), were injected at the rate of 6 mL/minute for 3 minutes. Then the above solutions were injected at the rate of 0.60 mL/minute for the remaining reaction time while pressure in the reactor was maintained at 4.5 MPa by addition of tetrafluoroethylene. A total of 840 g of tetrafluoroethylene was added over 141 minutes. The initiator and tetrafluoroethylene flows were halted, the reactor was allowed to cool and vented to atmospheric pressure. The reactor contents were discharged. After removing a 50 mL aliquot of the aqueous dispersion for farther analysis, the remaining latex was frozen in dry ice, thawed and filtered. The solid polymer was stirred with about 2-L of distilled water at 80° C., filtered and dried in a vacuum oven at about 120° C. overnight under a flow of nitrogen. Amount of polymer isolated was 951.3 g of fluffy white powder. Carboxyl end groups were not detected by infrared analysis. High temperature $^{19}$F NMR analysis of the polymer melt revealed 9.2 wt % hexafluoropropylene incorporation. Maximum in the DSC curve appeared at 278° C. (27.4 J/g) and extruded at 7.5 g/min in a melt index apparatus at 372° C. with a 5 kg weight.

EXAMPLE 18

Polymerization of Tetrafluoroethylene/
Hexafluoropropylene with Ammonium
Perfluorobutanesulfinate and Sodium Hypochlorite A 4-L horizontal autoclave with mechanical agitator was purged with nitrogen and charged with $CF_3CF_2CF_2OCF$ $(CF_3)CF_2OCFHCF_3$ (10 g) and 2-L of distilled water containing 4.48 g of ammonium perfluorooctanoate surfactant. The reactor was closed, the contents were heated to 103° C. and agitated at 90 rpm. The reactor was flushed with a mixture of 70 weight % hexafluoropropylene and 30 weight % tetrafluoroethylene and then pressured to 4.5 MPa with this gas mixture. Two solutions, one prepared by diluting 16.0 g of 5.6% aqueous sodium hypochlorite to 250 mL with distilled water, and the other prepared by adding distilled, deoxygenated water to 9.00 g of $CF_3CF_2CF_2CF_2SO_2NH_4$ to a final volume of 250 mL (including t .0 mL of concentrated ammonium hydroxide), were injected at the rate of 6 mL/minute for 3 minutes. Then the above solutions were injected at the rate of 0.60 mL/minute for the remaining reaction time while pressure in the reactor was maintained at 4.5 MPa by addition of tetrafluoroethylene. A total of 840 g of tetrafluoroethylene was added over 201 minutes. The initiator and tetrafluoroethylene flows were halted, the reactor was allowed to cool and vented to atmospheric pressure. The reactor contents were discharged. After removing a 50 mL aliquot of the aqueous dispersion for further analysis, the remaining latex was frozen in dry ice, thawed and filtered. The solid polymer was stirred with about 2-L of distilled water at 80° C., filtered and dried in a vacuum oven at about 120° C. overnight under a flow of nitrogen. Amount of polymer isolated was 912.4 g of fluffy white powder. Infrared analysis showed 30 carboxyl end groups/$10^6$ carbon atoms. High temperature $^{19}$F NMR analysis of the polymer melt revealed 8.9 wt % hexafluoropropylene incorporation. Maximum in the DSC curve appeared at 278.8° C. (23.5 J/g). Melt viscosity was too low to measure by the standard melt index apparatus at 372° C.

EXAMPLE 19

Polymerization of Tetrafluoroethylene/ Hexafluoropropylene with Ammonium Perfluorobutanesulfinate and Sodium Hypochlorite A 4-L horizontal autoclave with mechanical agitator was purged with nitrogen and charged with 2-L of distilled water containing 4.48 g of ammonium perfluorooctanoate surfactant. The reactor was closed, the contents were heated to 103° C. and agitated at 90 rpm. The reactor was flushed with a mixture of 70 weight % hexafluoropropylene and 30 weight % tetrafluoroethylene and then pressured to 4.5 MPa with this gas mixture. Two solutions, one prepared by diluting 17.3 g of 5.6% aqueous sodium hypochlorite to 250 mL with distilled water, and the other prepared by adding distilled, deoxygenated water to 5.28 g of $CF_3CF_2CF_2SO_2NH_4$ to a final volume of 250 mL, were injected at the rate of 6 mL/minute for 3 min. Then the above solutions were injected at the rate of 0.60 mL/minute for the remaining reaction time while pressure in the reactor was maintained at 4.5 MPa by addition of tetrafluoroethylene. A total of 840 g of tetrafluoroethylene was added over 156 min. The initiator and tetrafluoroethylene flows were halted, the reactor was allowed to cool and vented to atmospheric pressure. The reactor contents were discharged. After removing a 50 mL aliquot of the aqueous dispersion for further analysis, the remaining latex was frozen in dry ice, thawed and filtered. The solid polymer was stirred with about 2-L of distilled water at 80° C., filtered and dried in a vacuum oven at about 120° C. overnight under a flow of nitrogen. Amount of polymer isolated was 928.8 g of fluffy white powder. Carboxylic acid (monomeric) end groups were determined as 5 per $10^6$ carbon atoms by infrared analysis. High temperature 19F NMR analysis of the polymer melt revealed 8.6 wt % hexafluoropropylene incorporation. The product extruded at 1.33 g/min in a melt index apparatus at 372° C. (5 kg weight).

EXAMPLE 20

Polymerization of Tetrafluoroethylene/ Hexafluoropropylene with Ammonium Perfluorobutanesulfinate and Sodium Chlorate A 4-L horizontal autoclave with mechanical agitator was purged with nitrogen and charged with 2-L of distilled water containing 4.48 g of ammonium perfluorooctanoate surfactant. The reactor was closed, the contents were heated to 103° C. and agitated at 90 rpm. The reactor was flushed with a mixture of 70 weight % hexafluoropropylene and 30 weight % tetrafluoroethylene and then pressured to 4.5 MPa with this gas mixture. Two solutions, one prepared by adding distilled water to 1.38 g sodium chlorate to a final volume of 250 mL, and the other prepared by adding distilled, deoxygenated water to 5.28 g of $CF_3CF_2CF_2SO_2NH_4$ to a final volume of 250 mL, were injected at the rate of 6 mL/min for 3 min. Then the above solutions were injected at the rate of 0.60 mL/min for the remaining reaction time while pressure in the reactor was maintained at 4.5 MPa by addition of tetrafluoroethylene. A total of 840 g of tetrafluoroethylene was added over 143 min. The initiator and tetrafluoroethylene flows were halted, the reactor was allowed to cool and vented to atmospheric pressure. The reactor contents were discharged. After removing a 50 mL aliquot of the aqueous dispersion for further analysis, the remaining latex was frozen in dry ice, thawed and filtered. The solid polymer was stirred with about 2-L of distilled water at 80° C., filtered and dried in a vacuum oven at about 120° C. overnight under a flow of nitrogen. Carboxylic acid (monomeric) end groups were determined as 19 per $10^6$ carbon atoms by infrared analysis. High temperature $^{19}$F NMR analysis of the polymer melt revealed 8.6 wt % hexafluoropropylene incorporation. The product extruded at 3.69 g/min in a melt index apparatus at 372° C. (5 kg weight).

EXAMPLE 21

Polymerization of Tetrafluoroethylene/ Hexafluoropropylene with Ammonium Perfluorobutanesulfinate and Sodium Bromate A 4-L horizontal autoclave with mechanical agitator was purged with nitrogen and charged with 2-L of distilled water containing 4.48 g of ammonium perfluorooctanoate surfactant. The reactor was closed, the contents were heated to 103° C. and agitated at 90 rpm. The reactor was flushed with a mixture of 70 weight % hexafluoropropylene and 30 weight % tetrafluoroethylene and then pressured to 4.5 MPa with this gas mixture. Two solutions, one prepared by adding distilled water to 1.96 g of sodium bromate to a final volume of 250 mL, and the other prepared by adding distilled, deoxygenated water to 5.28 g of $CF_3CF_2CF_2SO_2NH_4$ to a final volume of 250 mL, were injected at the rate of 6 mL/min for 3 min. Then the above solutions were injected at the rate of 0.60 mL/min for the remaining reaction time while pressure in the reactor was maintained at 4.5 MPa by addition of tetrafluoroethylene. A total of 840 g of tetrafluoroethylene was added over 146 min. The initiator and tetrafluoroethylene flows were halted, the reactor was allowed to cool and vented to atmospheric pressure. The reactor contents were discharged. The latex was frozen in dry ice, thawed and filtered. The solid polymer was stirred with about 2-L of distilled water at 80° C., filtered and dried in a vacuum oven at about 120° C. overnight under a flow of nitrogen. Amount of polymer isolated was 934.9 g of fluffy white powder. Carboxylic acid (monomeric) end groups were determined as 9 per $10^6$ carbon atoms by infrared analysis. High temperature $^{19}$F NMR analysis of the polymer melt revealed 8.7 wt % hexafluoropropylene incorporation. The product extruded at 2.67 g/min in a melt index apparatus at 372° C. (5 kg weight). MIT flex life was improved by comparison with polymer samples produced using $CF_3CF_2CF_2SO_2NH_4$ with other oxidants, an advantage for using bromate ion as an oxidant.

What is claimed is:

1. A process for the preparation of a fluorine containing polymer, comprising, polymerizing, in an aqueous emulsion or suspension, a fluorine containing olefin, wherein the initiator is a combination of a fluoroaliphatic sulfinate or sulfinic acid and an oxidizing agent selected from the group consisting of chlorate ion, bromate ion, and hypochlorite ion, and provided that said fluoroaliphatic sulfinate or fluoroaliphatic sulfinic acid and said oxidizing agent are water soluble.

2. The process as recited in claim 1 wherein ammonia is also present.

3. The process as recited in claim 1 wherein said fluorine containing olefin is tetrafluoroethylene, vinyl fluoride, vinylidene fluoride, hexafluoropropylene, chlorotrifluoroethylene, or perfluoro(2,2-dimethyl-1,3-dioxole).

4. The process as recited in claim 1 wherein said fluorine containing olefin is tetrafluoroethylene.

5. The process as recited in claim 2 wherein said fluorine containing olefin is tetrafluoroethylene, vinyl fluoride, vinylidene fluoride, hexafluoropropylene, chlorotrifluoroethylene, or perfluoro(2,2-dimethyl-1,3-dioxole).

6. The process as recited in claim 2 wherein said fluorine containing olefin is tetrafluoroethylene.

7. The process as recited in claim 1 wherein said fluorine containing olefin and other monomers are present in the following combination:
tetrafluoroethylene;
tetrafluoroethylene/hexafluoropropylene;
tetrafluoroethylene/perfluoro(methyl vinyl ether);
tetrafluoroethylene/perfluoro(ethyl vinyl ether);
tetrafluoroethylene/perfluoro(n-propyl vinyl ether);
tetrafluoroethylene/perfluoro(2,2-dimethyldioxole);
vinyl fluoride;
tetrafluoroethylene/ethylene;
chlorotrifluoroethylene/ethylene;
tetrafluoroethylene/hexafluoropropylene/perfluoro(alkyl vinyl ether) wherein the alkyl group contains 1 to 5 carbon atoms;
hexafluoropropylene/vinylidene fluoride;
tetrafluoroethylene/hexafluoropropylene/vinylidene fluoride;
tetrafluoroethylene/vinylidene fluoride;
tetrafluoroethylene/perfluoro(methyl vinyl ether)/ perfluorinated curesite monomer; and chlorotrifluoroethylene.

8. The process as recited in claim 7 wherein ammonia is also present.

9. The process as recited in claim 1 wherein said sulfinate or sulfinic acid has the formula $[(R^1SO_2)_n]_qM_r$, wherein:
$R^1$ is fluoroaliphatic with n free valencies;
M is a cation of charge s;
s is 1 or 2;
n is 1 or 2; and
r and q are 1 or 2;
and provided that q·n=r·s.

10. The process as recited in claim 9 wherein M is an alkali metal cation or $NH_4^+$.

11. The process as recited in claim 1 wherein a process temperature is about 20° C. to about 150° C.

12. The process as recited in claim 10 wherein ammonia is also present.

13. The process as recited in claim 2 wherein at least about one mole of ammonia is present per mole of said sulfinate or said sulfinic acid present.

14. The process as recited in claim 10 wherein $R^1$ is perfluoro-n-alkyl.

15. The process as recited in claim 10 wherein M is sodium.

16. The process as recited in claim 9 wherein said oxidant is bromate and a counterion for said oxidant is an alkali metal cation.

17. The process as recited in claim 9 wherein said oxidant is chlorate and a counterion for said oxidant is an alkali metal cation.

18. The process as recited in claim 9 wherein said oxidant is hypochlorite and a counterion for said oxidant is an alkali metal cation.

19. The process as recited in claim 10 wherein said fluorine containing olefin and optional other monomers are present in the following combination:
tetrafluoroethylene;
tetrafluoroethylene/hexafluoropropylene;
tetrafluoroethylene/perfluoro(methyl vinyl ether);
tetrafluoroethylene/perfluoro(ethyl vinyl ether);
tetrafluoroethylene/perfluoro(n-propyl vinyl ether);
tetrafluoroethylene/perfluoro(2,2-dimethyldioxole);
vinyl fluoride;
tetrafluoroethylene/ethylene;
chlorotrifluoroethylene/ethylene;
tetrafluoroethylene/hexafluoropropylene/perfluoro(alkyl vinyl ether) wherein the alkyl group contains 1 to 5 carbon atoms;
hexafluoropropylene/vinylidene fluoride;
tetrafluoroethylene/hexafluoropropylene/vinylidene fluoride;
tetrafluoroethylene/vinylidene fluoride;
tetrafluoroethylene/perfluoro(methyl vinyl ether)/ perfluorinated curesite monomer; and chlorotrifluoroethylene.

20. The process as recited in claim 12 wherein said fluorine containing olefin and other monomers are present in the following combination:
tetrafluoroethylene;
tetrafluoroethylene/hexafluoropropylene;
tetrafluoroethylene/perfluoro(methyl vinyl ether);
tetrafluoroethylene/perfluoro(ethyl vinyl ether);
tetrafluoroethylene/perfluoro(n-propyl vinyl ether);
tetrafluoroethylene/perfluoro(2,2-dimethyldioxole);
vinyl fluoride;
tetrafluoroethylene/ethylene;
chlorotrifluoroethylene/ethylene;
tetrafluoroethylene/hexafluoropropylene/perfluoro(alkyl vinyl ether) wherein the alkyl group contains 1 to 5 carbon atoms;
hexafluoropropylene/vinylidene fluoride;
tetrafluoroethylene/hexafluoropropylene/vinylidene fluoride;
tetrafluoroethylene/vinylidene fluoride;
tetrafluoroethylene/perfluoro(methyl vinyl ether)/ perfluorinated curesite monomer; and chlorotrifluoroethylene.

21. The process as recited in claim 1 wherein said fluoroaliphatic sulfinate or sulfinic acid and said oxidizing agent are added to said process by continuously co-feeding separate solutions of said fluoroaliphatic sulfinate or sulfinic acid and said oxidizing agent.

22. The process as recited in claim 20 wherein said fluoroaliphatic sulfinate or sulfinic acid and said oxidizing agent are added to said process by continuously co-feeding separate solutions of said fluoroaliphatic sulfinate or sulfinic acid and said oxidizing agent.

* * * * *